Dec. 4, 1928.
D. C. PRINCE
1,694,281
ELECTRICAL APPARATUS
Filed June 29, 1926
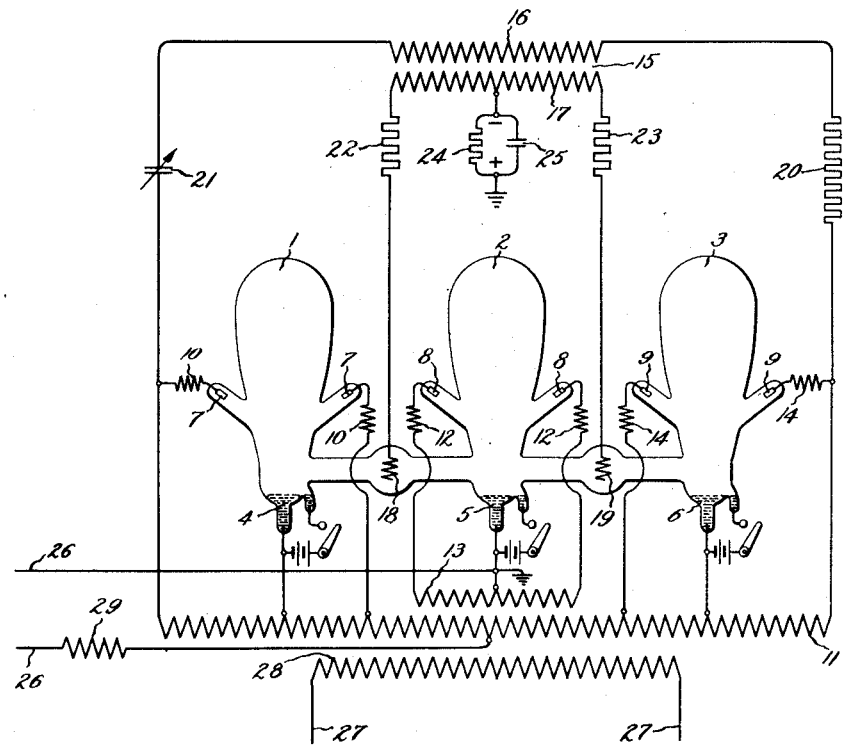
Inventor:
David C. Prince,
by
His Attorney, Patented Dec. 4, 1928.

1,694,281

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

ELECTRICAL APPARATUS.

Application filed June 29, 1926. Serial No. 119,431.

My invention relates to apparatus for interchanging power between different electrical circuits, and has for its principal object the provision of an improved apparatus which is operable to transmit power in either direction between direct and alternating current circuits.

Various arrangements have been proposed in the past for transmitting power between direct and alternating current circuits. Most of these arrangements have the disadvantage that their connections to the direct current circuit must be changed in order to reverse the direction in which they transmit power. In accordance with my invention, this difficulty is avoided by the provision of an apparatus so constructed and connected as to transmit power between the circuits in either direction.

My invention will be better understood from the following description when considered in connection with the accompanying drawing, and its scope will be pointed out in the appended claims.

The drawing illustrates an apparatus wherein my invention has been embodied.

This apparatus comprises an electron discharge device of the vapor electric type provided with vapor condensing chambers 1, 2, and 3, with vaporizable electrodes 4, 5 and 6, and with pairs of electrodes 7, 8 and 9 for continuously exciting the main electrodes 4, 5 and 6. It will be observed that the exciting electrodes 7, 8 and 9 are mounted in the chambers 1, 2 and 3 respectively, and are connected to the electrodes 4, 5 and 6, respectively, through smoothing reactors 10 and an end section of a transformer winding 11, through smoothing reactors 12 and a transformer winding 13, and through smoothing reactors 14 and an end section of the winding 11.

A transformer 15 comprising a primary circuit 16 and a secondary circuit 17 is provided for controlling the potentials of grids 18 and 19 of the electron discharge device. The primary circuit 16 is connected to the winding 11 through a resistor 20 and a capacitor 21 for causing a leading voltage to be applied to the circuit 16. The opposite end terminals of the secondary circuit 17 are connected to the grids 18 and 19 through resistors 22 and 23 respectively. A terminal intermediate these end terminals is connected to earth through a device which comprises a resistor 24 and a capacitor 25 and is provided for maintaining a negative potential at the mid terminal of the winding 17 while the potential of this winding is passing through its zero value. In the operation of the apparatus, power is interchanged between a direct current circuit 26 and an alternating current circuit 27, the circuit 26 being connected between the mercury electrode 5 and a terminal intermediate the ends of the winding 11 and the circuit 27 being connected to a transformer winding 28 which may be wound on the same core as the windings 11 and 13. A smoothing reactor 29 is connected in the positive lead of the direct current circuit 26.

It is customary to provide vapor electric devices with a plurality of electrodes which operate as anodes and with only one electrode which normally operates as a cathode. With this construction, each anode is maintained at a negative potential during an appreciable interval of time, and it is a comparatively simple matter to prevent the starting of current to the anode by means of a grid which is charged to a negative potential. The electrodes 4, 5 and 6 of the illustrated apparatus, however, are of such a character that current is readily transmitted in either direction between them. A reversal of current between the electrodes may therefore take place instantaneously and control of the current by the grid is not secured unless the grid is charged to a negative potential at the instant the anode current becomes zero.

Due to the fact that the condenser 25 discharges its stored energy slowly through resistor 24 and tends to maintain the mid terminal of the winding 17 at a negative potential while the current in the winding is reversing, the grids 18 and 19 are both charged simultaneously to a negative potential while their relative potential is changing. Thus, if current is being carried between electrodes 4 and 5 with grid 18 positive and grid 19 negative, no current can start between 5 and 6. When grids 18 and 19 arrive at the same potential, the current can still not start from between electrodes 5 and 6, but, as long as it is flowing between electrodes 4 and 5, the grid is not able to interrupt it. As soon as grid 19 becomes positive, current begins to flow between electrodes 5 and 6 and dies out between electrodes 4 and 5. At the instant that it becomes zero, the grid 18, which is already negative, will prevent any further flow in either direction. Were grids 18 and 19 simultaneously positive, it would be possible for the current to commence to flow between electrodes 5 and 6 and to reverse the direction of flow between electrodes 4 and 5, thus establishing a complete short circuit which could not be interrupted if grid 18 subsequently were charged negatively. It is necessary for the potential of grid 19, however, to become positive before the current can start between electrodes 5 and 6. In apparatus of this sort, it is necessary always to have current flow so that the total current passing through inductance 29 is maintained relatively constant.

Due to the fact that any of the electrodes 4, 5 and 6 are capable of functioning either as anodes, or cathodes, no changes in connections between the direct current circuit 26 and the electron discharge apparatus are required to permit a change in the direction of power transmission through this apparatus. It is desirable that the potentials of grids 18 and 19 lead the potentials of the electrodes 4 and 6 by a phase angle which is greater when the apparatus is transmitting power from the circuit 26 to the circuit 27 than when power is transmitted in the reverse direction. This result may be accomplished by adjustment of the capacitor 21.

The embodiment of the invention illustrated and described herein has been selected for the purpose of clearly setting forth the principles involved. It will be apparent, however, that the invention is susceptible of being modified to meet the different conditions encountered in its use, and I therefore aim to cover by the appended claims all modifications within the true spirit and scope of my invention.

What I claim as new and desire to secure by Letters Patent of the United States is:

1. The combination of alternating and direct current circuits, an electron discharge device comprising a plurality of vaporizable electrodes connected between said circuits, means for controlling the transmission of current between said electrodes, and means connected between one of said electrodes and said control means for maintaining said control means at a negative potential with respect to said electrode while said current passes through its zero value.

2. The combination of alternating and direct current circuits, an electron discharge device comprising a plurality of vaporizable electrodes connected between said circuits, means for controlling the transmission of current between said electrodes, and means comprising a capacitor and a resistor connected between one of said electrodes and said control means for maintaining said control means at a negative potential with respect to said electrode while said current passes through its zero value.

3. The combination of alternating and direct current circuits, an electron discharge device comprising a plurality of vaporizable electrodes connected between said circuits, a grid for controlling the transmission of current between said electrodes, and means connected between one of said electrodes and said grid for maintaining said grid at a negative potential while said current passes through its zero value.

4. The combination of alternating current and direct current circuits, an electron discharge device comprising a plurality of vaporizable electrodes connected between said circuits, a grid for controlling the transmission of current between said electrodes, and a resistor and capacitor connected in parallel between said grid and one of said electrodes for maintaining a negative potential on said grid while said current is passing through its zero value.

5. The combination of alternating current and direct current circuits, an electron discharge device comprising a plurality of vaporizable electrodes connected between said circuits, a grid for controlling the transmission of current between said electrodes, means connected between one of said electrodes and said grid for maintaining said grid at a negative potential while said current passes through its zero value, and means for adjusting the phase relation between the potentials of said grid and another of said electrodes.

In witness whereof, I have hereunto set my hand this 23d day of June, 1926.

DAVID C. PRINCE.